United States Patent
Hauser (10) Patent No.: US 7,918,088 B1
(45) Date of Patent: Apr. 5, 2011

(54) DUAL PUMP ASSEMBLY

(75) Inventor: Raymond Hauser, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 294 days.

(21) Appl. No.: 12/109,088

(22) Filed: Apr. 24, 2008

Related U.S. Application Data (63) Continuation of application No. 10/987,681, filed on Nov. 12, 2004, now Pat. No. 7,377,105.

(51) Int. Cl.
*F16D 31/02* (2006.01)
(52) U.S. Cl. .......................... 60/486; 60/484
(58) Field of Classification Search .............. 60/484, 60/485, 486; 92/12.2; 74/11
See application file for complete search history.

(56) References Cited

U.S. PATENT DOCUMENTS

| | | | |
|---|---|---|---|
| 1,539,616 A | 5/1925 | Williams |
| 2,875,701 A | 3/1959 | Ebert |
| 2,914,219 A | 11/1959 | Chiantelassa |
| 3,279,172 A | 10/1966 | Kudo et al. |
| 3,367,105 A | 2/1968 | Dowty |
| 3,486,335 A | 12/1969 | Kern et al. |
| 3,643,433 A | 2/1972 | Widmaier |
| 3,859,790 A | 1/1975 | Bacquie et al. |
| 3,922,931 A | 12/1975 | Osujyo et al. |
| 4,116,292 A | 9/1978 | Todeschini et al. |
| 4,252,508 A | 2/1981 | Forster |
| 4,256,439 A | 3/1981 | Kosodo et al. |
| 4,270,408 A | 6/1981 | Wagner |
| 4,327,603 A | 5/1982 | Zaunberger et al. |
| 4,426,911 A | 1/1984 | Robinson et al. |
| 4,534,271 A | 8/1985 | Forster |
| 4,819,508 A | 4/1989 | Yamaoka et al. |
| 4,893,524 A | 1/1990 | Ohashi et al. |
| 4,971,535 A | 11/1990 | Okada et al. |
| 5,040,429 A | 8/1991 | Del Castillo |
| 5,078,222 A | 1/1992 | Hauser et al. |
| 5,207,060 A | 5/1993 | Sheets |
| 5,247,794 A | 9/1993 | Benson et al. |
| 5,304,043 A | 4/1994 | Shilling |
| 5,354,180 A | 10/1994 | Forster |
| 5,392,670 A | 2/1995 | Hauser |
| 5,501,578 A | 3/1996 | Skirde |
| 5,542,307 A | 8/1996 | Hasegawa et al. |

(Continued)

FOREIGN PATENT DOCUMENTS

EP 1473183 A2 11/2004

(Continued)

OTHER PUBLICATIONS

Dixie Choper, Operation Manual 1998, Cover Page adn pp. 50-51, 60-61, 66, Revision #5 Feb. 1998.

(Continued)

*Primary Examiner* — Michael Leslie
(74) *Attorney, Agent, or Firm* — Neal, Gerber & Eisenberg LLP (57) ABSTRACT

A dual pump apparatus for use on a vehicle or industrial application having a housing in which a pair of hydraulic pumps are mounted and driven by a prime mover. The prime mover is drivingly coupled to a main input shaft, which drives the hydraulic pumps. An auxiliary pump may be drivingly coupled to the main drive shaft and a power take off unit may also be connected thereto. The power take off unit may be driven by a power take off unit output drive shaft, on which a cooling fan may be attached.

29 Claims, 12 Drawing Sheets

U.S. PATENT DOCUMENTS

| | | |
|---|---|---|
| 5,800,134 A | 9/1998 | Hasegawa et al. |
| 6,022,198 A | 2/2000 | Hoffmeister |
| 6,199,380 B1 | 3/2001 | Ishii |
| 6,267,189 B1 | 7/2001 | Nielsen et al. |
| 6,301,885 B1 | 10/2001 | Johnson et al. |
| 6,332,393 B1 | 12/2001 | Trimble |
| 6,361,282 B1 | 3/2002 | Wanschura |
| 6,363,815 B1 | 4/2002 | Ishimaru et al. |
| 6,382,339 B1 | 5/2002 | Nemoto |
| 6,425,244 B1 | 7/2002 | Ohashi et al. |
| 6,474,218 B2 | 11/2002 | Saito et al. |
| 6,487,856 B1 | 12/2002 | Ohashi et al. |
| 6,494,686 B1 | 12/2002 | Ward |
| 6,578,656 B2 | 6/2003 | Samejima et al. |
| 6,672,058 B1 | 1/2004 | Langenfeld et al. |
| 6,672,843 B1 | 1/2004 | Holder et al. |
| 6,705,840 B1 | 3/2004 | Hauser et al. |
| 6,736,605 B2 | 5/2004 | Ohashi et al. |
| 6,820,403 B2 | 11/2004 | Umemoto |
| 6,877,302 B2 | 4/2005 | Samejima et al. |
| 6,953,327 B1 | 10/2005 | Hauser et al. |
| 6,973,783 B1 | 12/2005 | Hauser et al. |
| 6,988,580 B2 | 1/2006 | Ohashi et al. |
| 7,028,472 B2 | 4/2006 | Ohashi et al. |
| 7,044,259 B2 | 5/2006 | Stoll et al. |
| 7,146,810 B1 | 12/2006 | Hauser et al. |
| 7,162,870 B1 | 1/2007 | Hauser |
| 7,334,404 B2 | 2/2008 | Sakikawa et al. |
| 7,370,714 B2 | 5/2008 | Yasuda et al. |
| 7,377,105 B1 | 5/2008 | Raymond |
| 2005/0016304 A1 | 1/2005 | Ishii et al. |
| 2006/0272496 A1 | 12/2006 | Ohashi |

FOREIGN PATENT DOCUMENTS

| | | |
|---|---|---|
| JP | 2000009023 A | 1/2000 |
| JP | 2001146951 | 5/2001 |
| JP | 2001263259 | 9/2001 |
| WO | WO 9967532 | 12/1999 |

OTHER PUBLICATIONS

Non-Final Office Action mailed on Feb. 10, 2009 for U.S. Appl. No. 12/014,843.

FIG. 12

DUAL PUMP ASSEMBLY

CROSS REFERENCE

This application is a continuation of U.S. patent Ser. No. 10/987,681 filed on Nov. 12, 2004, which is incorporated by reference herein in its entirety.

BACKGROUND OF THE INVENTION

This application relates in general to hydrostatic pumps and transmissions and in particular to a dual pump arrangement. Hydrostatic pumps are well-known for use in driving vehicles such as tractors and other off-road devices. Such pumps are also used in a wide variety of industrial applications other than vehicles.

In one known arrangement for a vehicle, a plurality of pumps is mounted in separate housings on a vehicle frame. Each pump is connected to a respective hydrostatic motor through high pressure hoses, which are often connected to the pump through an end cap. The end cap is secured to the pump housing and includes a running surface for the pump cylinder block and porting to connect the cylinder block to the hoses.

A control arm is engaged to each hydrostatic pump to control the output of the pump. In a known design, the hydrostatic pump is of an axial piston design and the control arm is engaged to a swash plate, the rotation of which can change the output of the pump from forward to neutral to reverse. Rotation of the pumps is provided by rotary input shafts which are separately driven by the vehicle engine by pulleys and belts or other known methods. The pump transmits hydraulic fluid through one of a pair of high pressure hoses to a hydrostatic motor. Rotational output of the motor is then transmitted to the vehicle drive wheels through an output axle or other known means.

Such an arrangement allows for zero turn capability, since the hydrostatic pumps may be operated independently of one another. However, there is a cost involved with this arrangement, as it requires at least four separate housings for the individual pumps and motors, and each housing must be individually secured to the vehicle frame.

A BDU transmission, which is a hydrostatic transmission ("HST") that is currently known in the industry, comprises a single housing enclosing both a hydrostatic pump and a hydrostatic motor, both of which are mounted to a single plate. The pump input shaft and motor output shaft are parallel to one another, and the plate contains hydraulic porting to connect the pump and motor. One such hydrostatic transmission is shown in U.S. Pat. No. 5,392,670. Such an HST is generally used to connect to a drive train for powering output axles of a tractor or similar vehicle.

SUMMARY OF THE INVENTION

A dual pump apparatus for use on a vehicle or industrial application having a housing in which a pair of hydraulic pumps are mounted and driven by a prime mover is provided. The prime mover is drivingly coupled to a main input shaft, which drives the hydraulic pumps. An auxiliary pump may be drivingly coupled to the main drive shaft and a power take off unit may also be connected thereto. The power take off unit may be driven by a power take off unit output drive shaft, on which a cooling fan may be attached.

A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

The following is a description of the multiple embodiments of this invention. Where appropriate, like numerals indicate identical or substantially identical components, and similar numerals with a different initial numeral indicate similar components with certain differences as specified. Further, in each of the embodiments discussed herein, identical numerals followed by "a" and "b" identify elements that are either identical or are mirror images of each other. Therefore, for convenience, the descriptions of elements with numerals followed by "a" apply equally to elements with identical numerals followed by "b."

Figure 1:
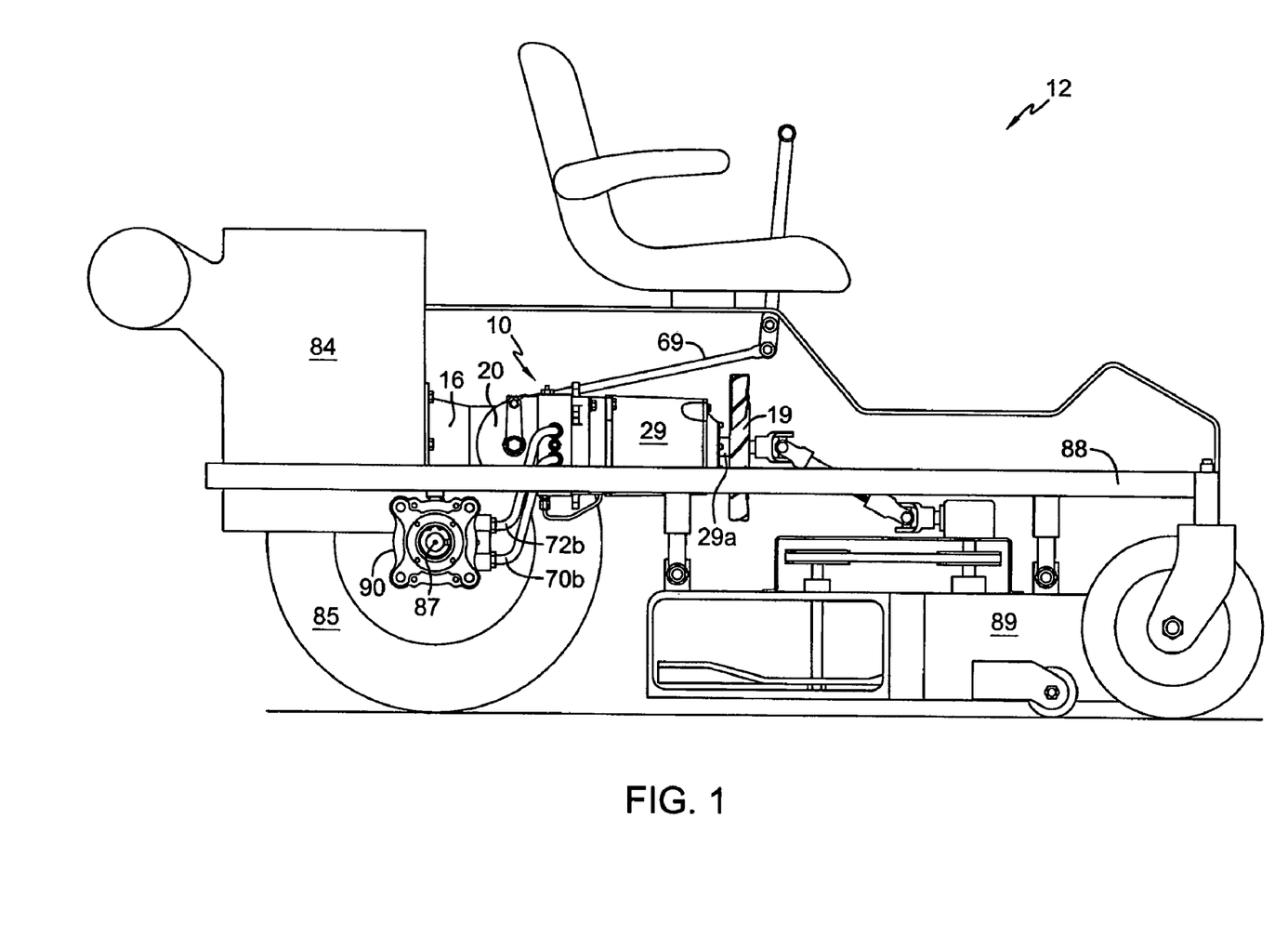
FIG. 1 depicts a vehicle employing a first embodiment of the drive assembly of the present invention with one drive wheel removed for clarity.
Figure 4:
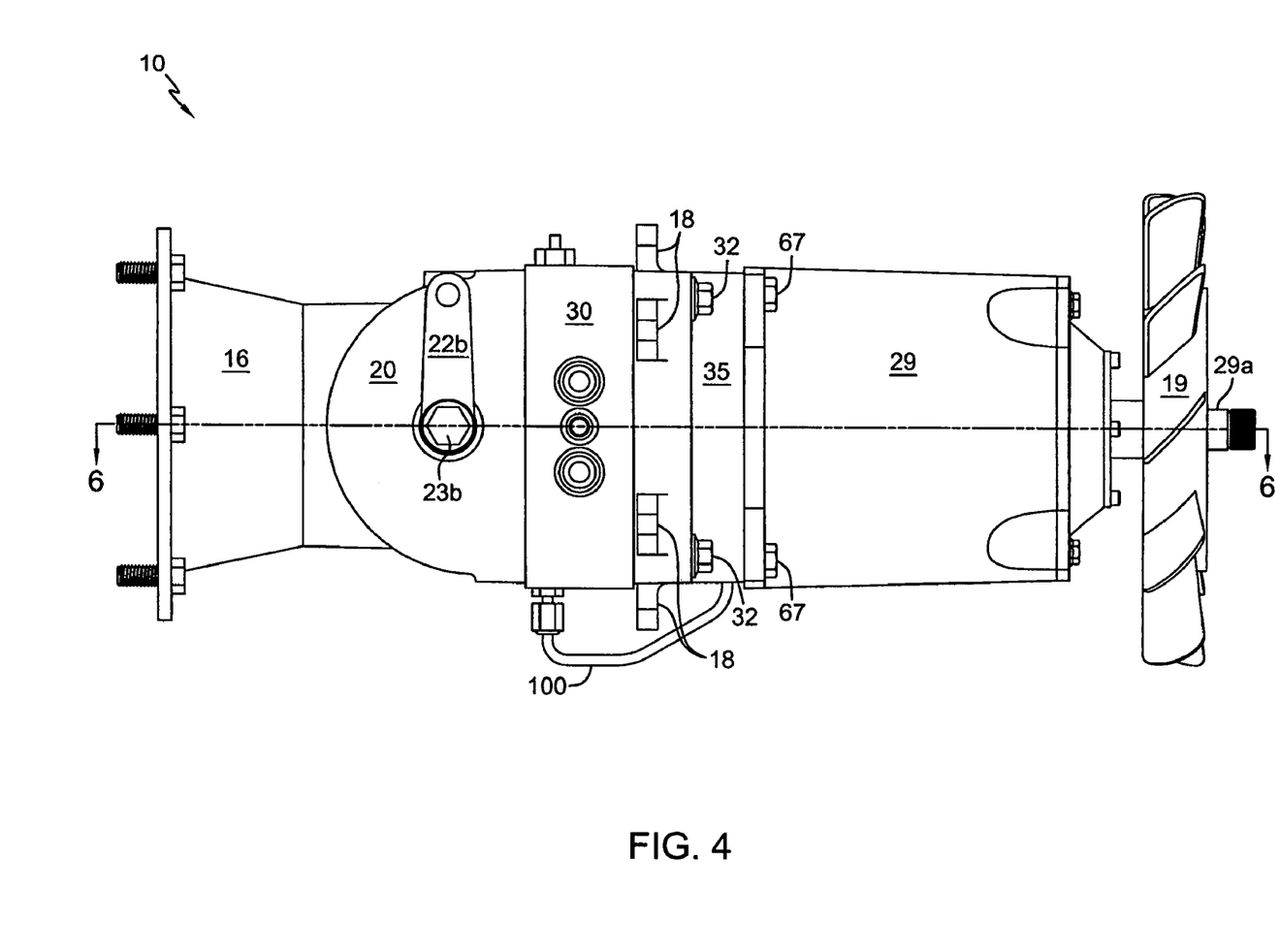
FIG. 4 is a side view of the external casing of a first embodiment of this invention.
Figure 5:
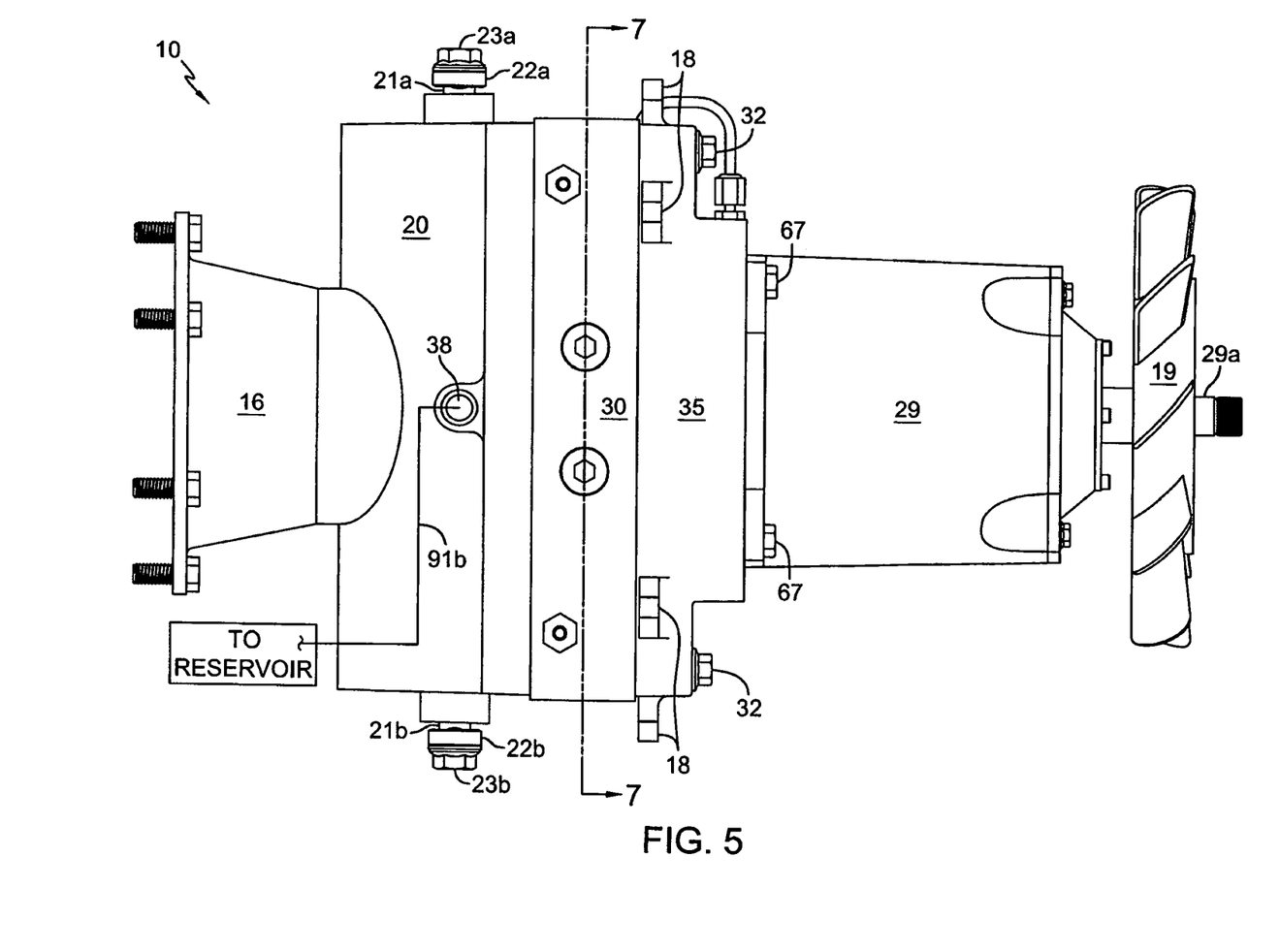
FIG. 5 is a top view of the dual pump design shown in FIG. 4.
Figure 6:
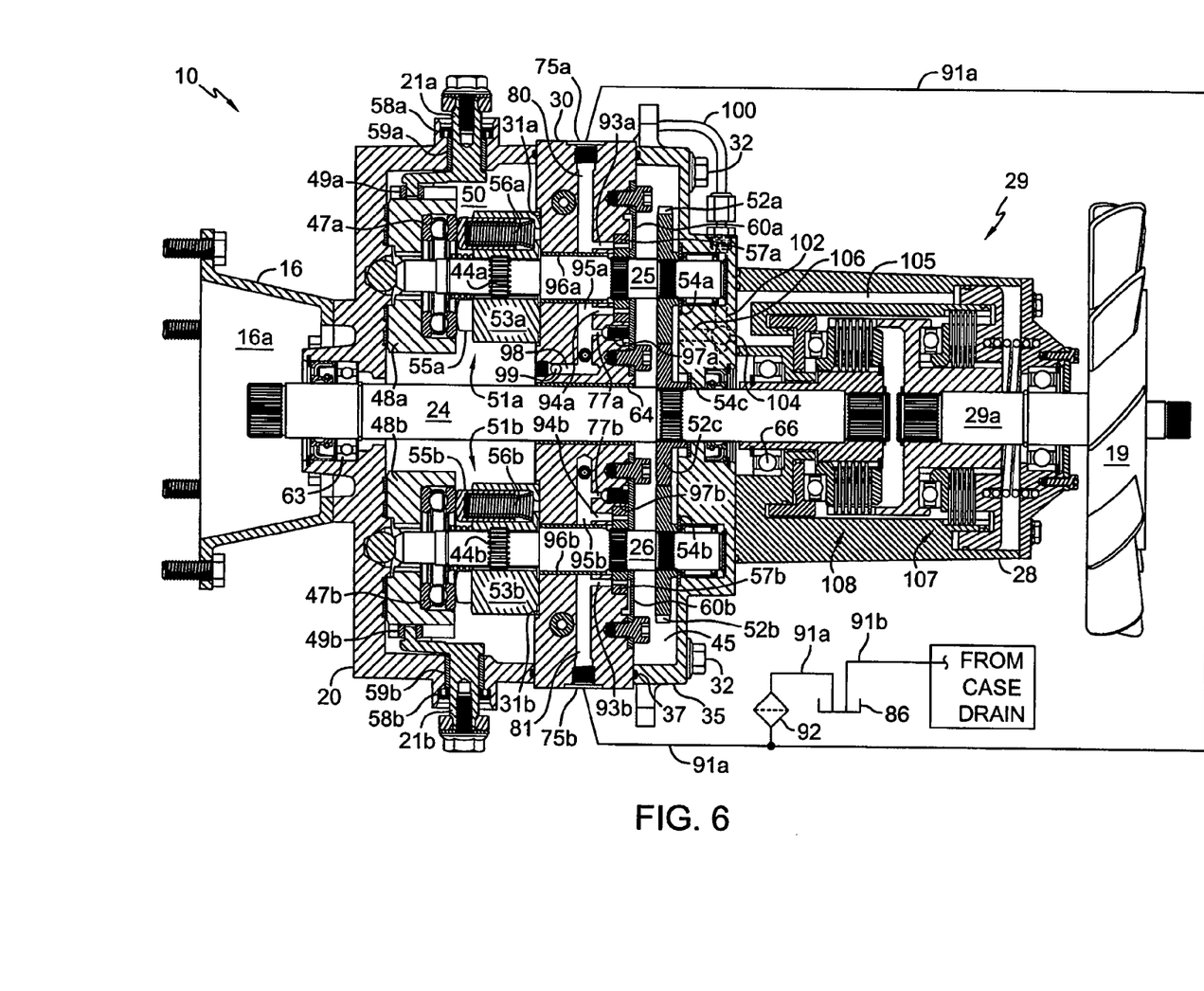
FIG. 6 is a cross-sectional view of the internal components of the dual pump arrangement shown in FIG. 4, along the lines 6-6 in FIG. 4, with certain parts shown as solid, and certain system elements shown schematically.
Figure 7:
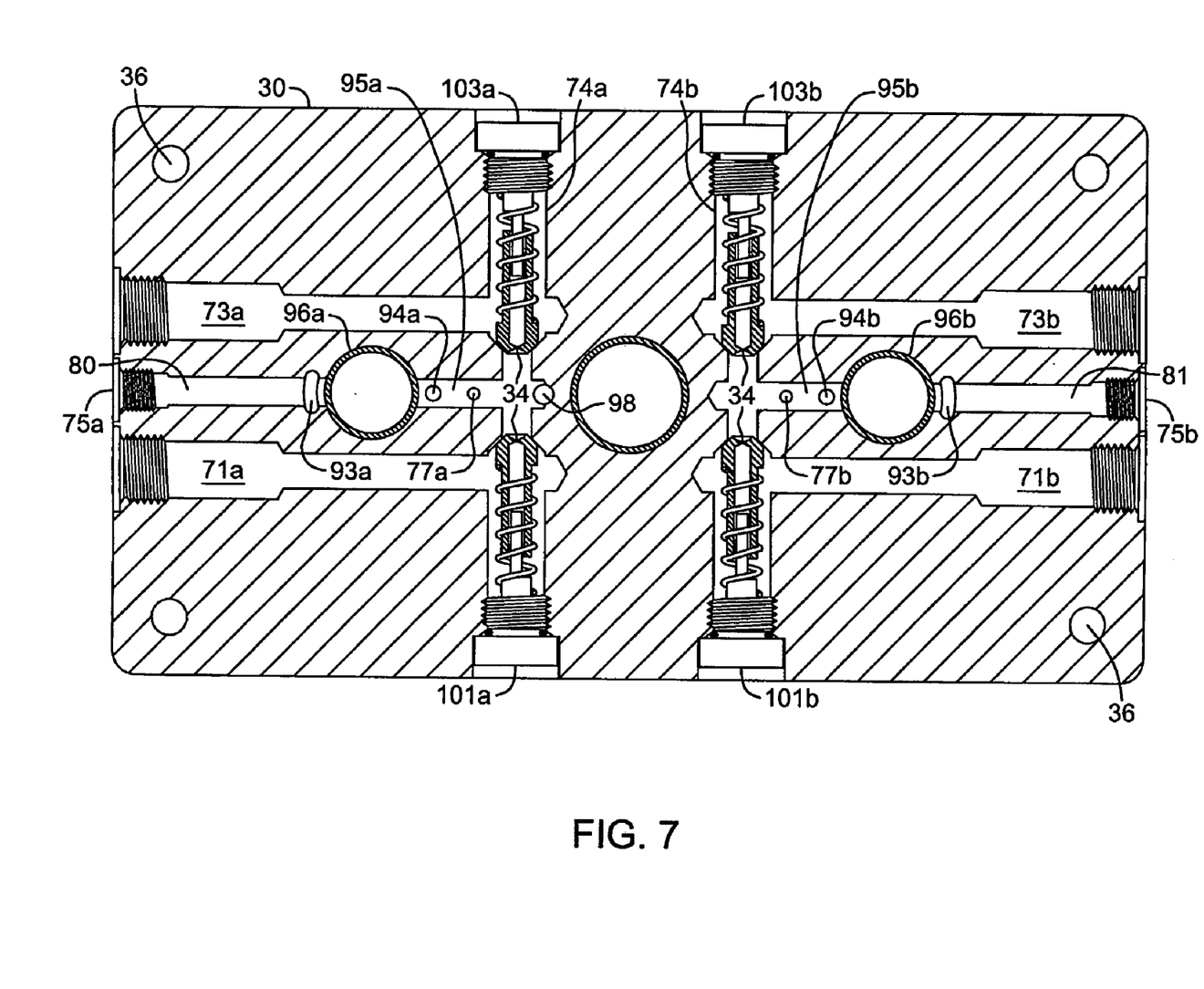
FIG. 7 is a cross-sectional view of the end cap of a first embodiment, along the lines 7-7 in FIG. 5.

A vehicle 12 employing a first embodiment of a dual pump unit 10 is shown in FIG. 1, while the external structure thereof is shown in FIGS. 4 and 5. The internal structure of dual pump unit 10 is shown in FIG. 6. While the hydraulic porting of end cap 30 is shown in FIG. 7, it will be understood that the drawings are not to scale, and the arrangement and sizing of the components will be obvious to a person of skill in the art. The size of pumps 51a and 51b and the other components will be dictated primarily by the intended applications of the unit and any required external dimensions.

FIG. 1 depicts a vehicle 12 incorporating a first embodiment of the present invention. The arrangement shown here is of a rear engine mounting, where engine 84 is mounted on vehicle frame 88, which also supports motors 90, mower deck 89 and other possible attachments. Axles 87 extend from motors 90 and drive vehicle wheels 85.

Pump housing 20 is mounted by way of bell housing 16 to engine 84 so that pump housing 20 is generally parallel to vehicle frame 88 and end cap 30 is perpendicular to vehicle frame 88. Attach points 18 formed on gear chamber cover 35 may also be used to secure pump apparatus 10 to frame 88 in a number of known manners. Hydraulic hoses 70b and 72b carry fluid from threaded system ports 71 and 73 to respective motors 90. Pump apparatus 10 is preferably located along the center line of the vehicle, i.e., along the center of the longitudinal axis of the vehicle parallel to and between members of frame 88. This location of pump apparatus 10 simplifies the arrangement and connections of the various hoses, linkage mechanisms and the like. One such advantage is that hoses 70 and 72 may be generally symmetrical in length and routing. This length symmetry includes having hoses 70 of one generally identical length and hoses 72 of a second generally identical length, or having hoses 70 and 72 being of one generally identical length. Note that while the aforementioned discussion relates to the preferable positioning of pump unit 10 on the vehicle center line, pump unit 10 may be positioned in other locations as need dictates.

Figure 2:
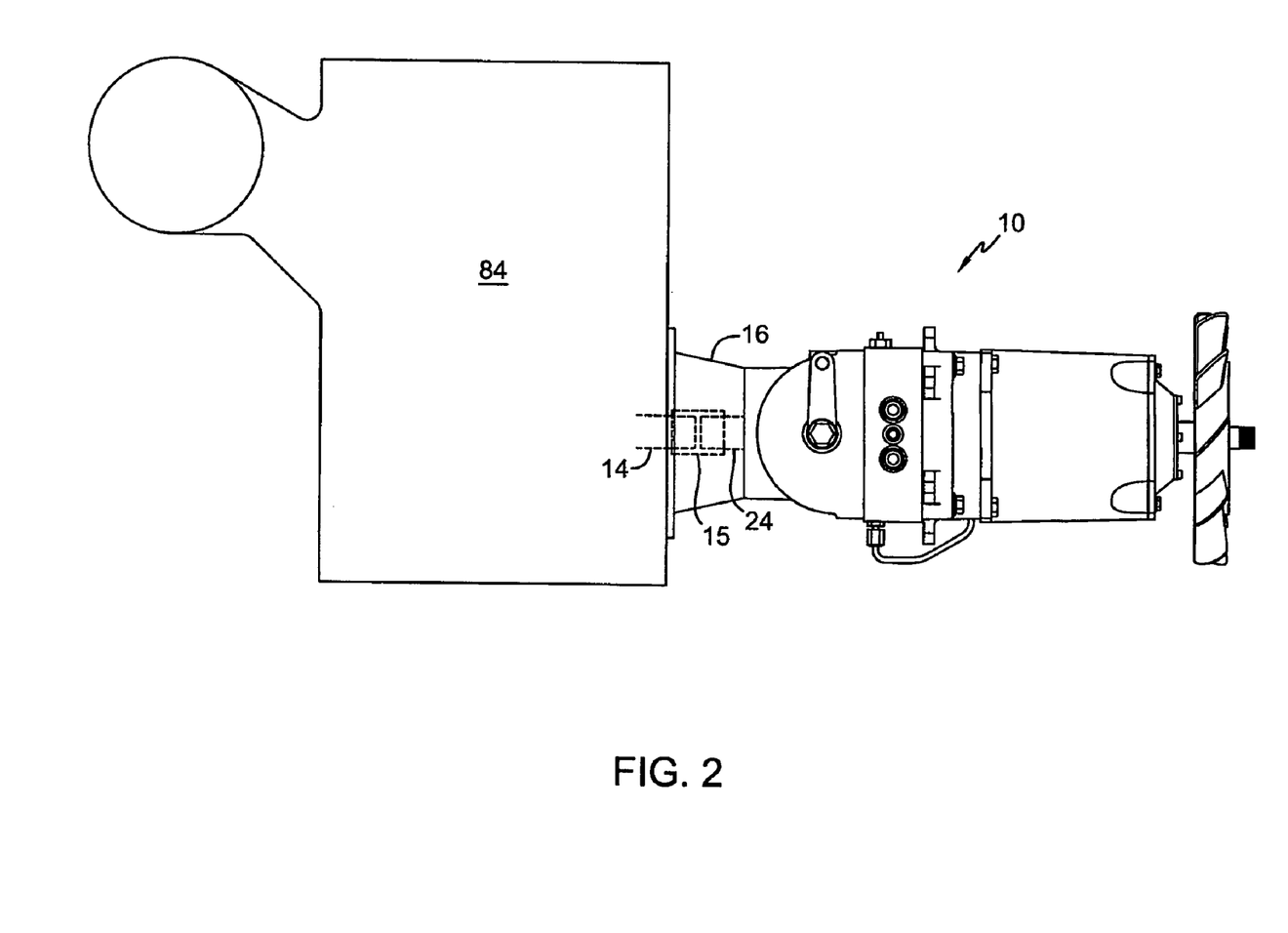
FIG. 2 is a side view of a first embodiment of this invention with certain internal elements shown in phantom to show one type of connection to the prime mover.
Figure 3:
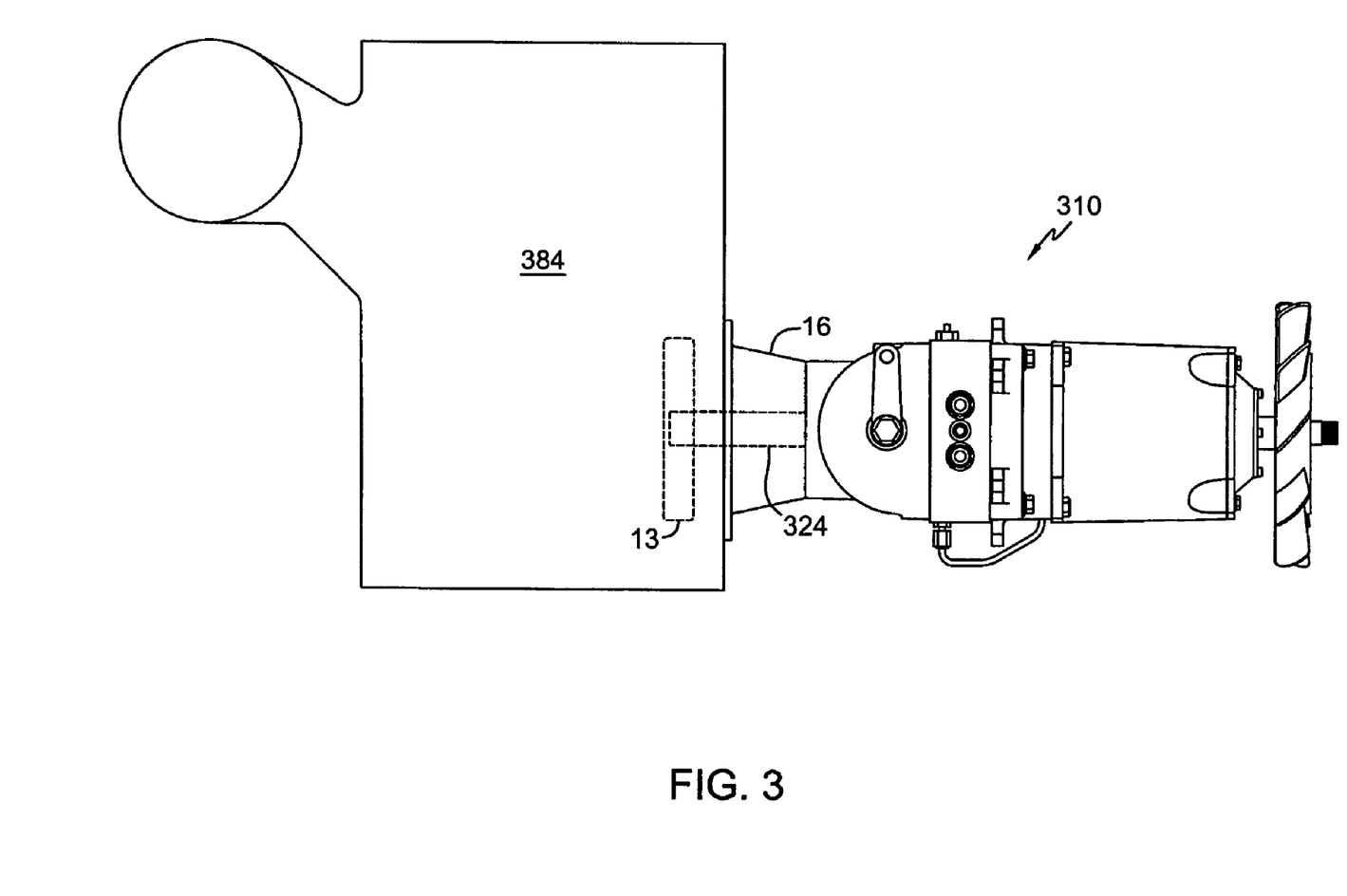
FIG. 3 is a side view of a first embodiment of this invention with certain internal elements shown in phantom to show another type of connection to the prime mover.

Bell housing 16 is positioned between and secured to both pump unit 10 and engine 84. In addition, as shown in FIG. 6, bell housing 16 forms an enclosed space 16a covering the coupling between main drive shaft 24 and engine 84. There are a variety of configurations for connecting main drive shaft 24 to a prime mover 84 output. One such configuration is depicted in FIG. 2, where an engine output shaft 14 is connected to a coaxially positioned main input shaft 24 by coupler 15. Another possible configuration is depicted in FIG. 3, where main input shaft 324 of pump apparatus 310 is connected to flywheel 13 of prime mover 384.

Inside housing 20 is located a pump chamber (or cavity) 50 in which are mounted a first rotatable pump 51a and a second pump 51b, both of which are rotatably mounted on their respective running surfaces 31a and 31b on end cap 30. End cap 30 is secured to housing 20 by fasteners 32, which also secure gear chamber cover 35 to end cap 30 and which extend through openings 36 in end cap 30 into threaded openings (not shown) in housing 20. End cap 30 acts to close off pump chamber 50.

The following discussion of pump 51a will also apply to second pump 51b. Pump 51a is of the axial piston design and comprises rotatable cylinder block 53a, in which are mounted a plurality of axial stick pistons 55a, each of which includes a piston spring 56a therein, with cylinder block 53a engaged to first pump shaft 25 by means of spline 44a or similar means. Pistons 55a abut a thrust bearing 47a mounted in swash plate 48a. Trunnion arm 21a interfaces with swashplate 48a through slider bearing 49a. Rotation of trunnion arm 21a thus moves swash plate 48a and will control the direction and flow rate of the output of hydraulic pump 51a. End cap 30 is preferably made of aluminum; it should be understood that materials such as cast iron may also be used and a valve plate may be used in conjunction with either material.

Figure 8:
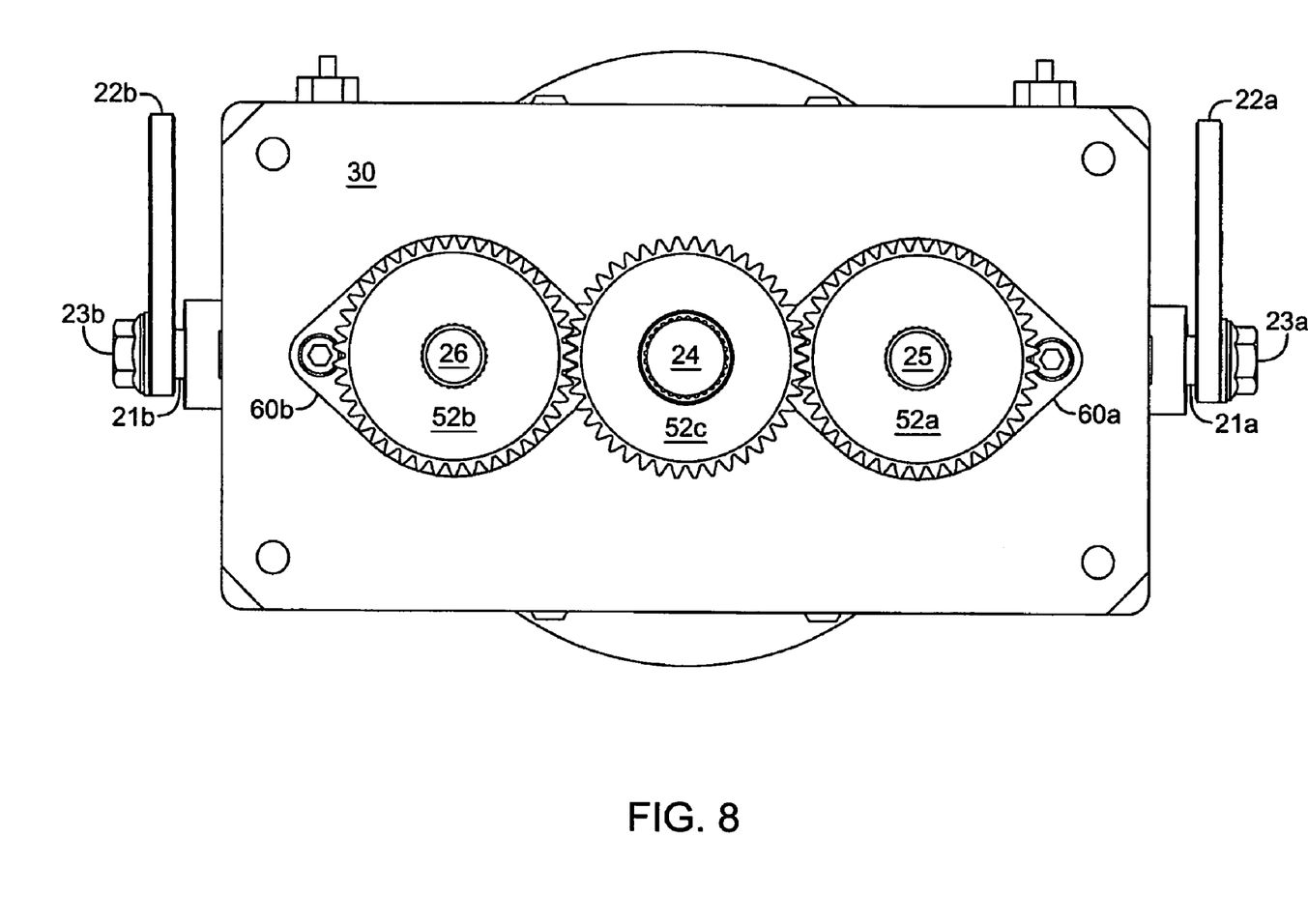
FIG. 8 is an end view of the dual pump design shown in FIG. 5 with the PTO and gear chamber cover removed.

Trunnion arm 21a extends out from housing 20 through seal 58a and bushing 59a. As shown in FIG. 8, control arms 22a and 22b are mounted to trunnion arms 21a and 21b with fasteners 23a and 23b. Control arms 22a and 22b can be engaged to various linkage mechanisms so that pumps 51a and 51b can be independently controlled by a vehicle operator. The location of trunnion arms 21a and 21b on opposite ends of housing 20 (corresponding to the sides of vehicle frame 88) permits the use of more efficient linkage systems 69.

Main drive shaft 24 is directly engaged to an engine or prime mover 84 on one end and drivingly engaged to pump shafts 25 and 26, as discussed in more detail below and as shown most clearly in FIGS. 1, 2 and 6. For drivingly coupling main drive shaft 24 to pump shafts 25 and 26, a plurality of gear sets may be employed, which will be discussed in greater detail below. In this embodiment, the output of engine 84 is horizontal with respect to the ground, as are main drive shaft 24 and pump shafts 25 and 26.

Drive shaft 24 may also extend outside gear chamber cover 35 and drive a power take off unit ("PTO") 29. PTO 29 may assume an engaged and disengaged position. In the engaged position, PTO shaft 29a will be coupled to drive shaft 24 and may be used to power an output device, such as a mower deck. In the disengaged position, PTO shaft 29a and drive shaft 24 will not be in driving communication with one another. PTO shaft 29a extends outside PTO 29 and, as shown in, e.g., FIGS. 1 through 6, a cooling fan 19 may be mounted on PTO shaft 29a. Therefore, when PTO 29 is engaged and drive shaft 24 is coupled to PTO shaft 29a drive shaft 24 will supply the driving force for PTO 29 and fan 19. It should be noted that PTO 29 and the corresponding extension of main drive shaft 24 through gear chamber cover 35 is optional; shaft 24 need not extend out in such a manner, in which case gear chamber cover 35 would be a solid structure on the end thereof.

PTOs are known in the art, so only minimal explanation of the function of PTO 29 will be provided herein. PTO 29 is attached to end cap 30 by a plurality of fasteners 67. Since PTO 29 as depicted is hydraulically controlled a source of hydraulic fluid is required. In the embodiment shown in FIGS. 6 and 7, charge fluid from passage 94a is directed to charge gallery 95a and then through passage 98 to passage 99, to which is connected hydraulic line 100, shown in FIGS. 4 and 6. Line 100 is connected to passage 102 in gear chamber cover 35. Valve 104, which is operator controlled by one of a variety of known techniques, is used to activate and deactivate PTO 29. Valve 104 either provides pressurized fluid from passage 102 to PTO gallery 105, or it blocks fluid from passage 102 from entering into gallery 105 while relieving pressure from gallery 105. The fluid relieved from gallery 105 travels through passage 106, which is either connected to gear chamber 45 or pump chamber 50 by an internal or external connection.

When valve 104 is operated to provide pressurized fluid from passage 102 to gallery 105, PTO brake 107, which normally clamps PTO shaft 29a to PTO housing 28, is deactivated, thereby leaving PTO shaft 29a free to rotate. As PTO brake 107 is being deactivated, PTO clutch 108 is being activated, connecting main drive shaft 24 to PTO shaft 29a, thus causing PTO shaft 29a to rotate with shaft 24. When valve 104 is returned to a deactivated position pressure is released from gallery 105, allowing clutch 108 to be deactivated and brake 107 to be activated, uncoupling PTO shaft 29a from shaft 24 and braking PTO shaft 29a.

As shown in FIGS. 6 and 8, spur gears 52a, 52b and 52c, which are preferably helical spur gears, are mounted in gear chamber 45, which may be sealed from pump chamber 50. Spur gear 52c is mounted on main drive shaft 24 and is directly engaged to spur gears 52a and 52b, which are mounted on shaft 25 and shaft 26, respectively. Gears 52a, 52b, and 52c are positioned by shoulders formed on their respective shafts and by proximity to washers 54a, 54b and 54c, which are located adjacent gear chamber cover 35. Shafts 25 and 26 in turn drive first and second pumps 51a and 51b, respectively.

Gear chamber 45 is formed by end cap 30 and gear chamber cover 35, which is secured to housing 20 through end cap 30 by a plurality of fasteners 32, as previously noted. A sealant, gasket, or o-ring 37 may be used at this junction to prevent leakage of hydraulic oil or gear grease. Main drive shaft 24 may be supported and located in a variety of locations, such as PTO 29 by sealed bearing 66, housing 20 by bearing 63, end cap 30 by bearing 64, or in gear chamber cover 35. Cooling fan 19 is secured to main drive shaft 24 by a spline and retaining ring (not shown) or may be secured by a number of other known configurations. An optional oil cooler (not shown) could also be added to the system and located to take advantage of the air flow from cooling fan 19. A seal may be positioned adjacent main drive shaft 24 between pump chamber 50 and gear chamber 45 so that different lubricants may be used in each chamber, such as oil in pump chamber 50 and grease in gear chamber 45.

As shown most clearly in FIG. 6, charge pumps 57a and 57b, which are gerotor style charge pumps, are mounted in end cap 30 and splined to pump shafts 25, 26. Charge pumps 57a and 57b may be secured in end cap 30 by charge covers 60a and 60b. Kidney 93a provides oil from passage 80 to charge pump 57a. As shown in FIGS. 6 and 7, pressurized oil is sent from charge pump 57a to charge gallery 95a through passage 94a. Charge relief opening 77a is also formed in charge gallery 95a to permit oil to be discharged therethrough by means of charge relief valve 97a in the event of excess oil pressure.

The hydraulic porting in end cap 30 is shown in FIG. 7. System ports 71 and 73 extend into end cap 30, with ports 71a and 73a in communication with first pump 51a and ports 71b and 73b in communication with second pump 51b. A set of check valves 101a, 101b, 103a and 103b is threaded into respective openings 74a and 74b in end cap 30, corresponding to ports 71a, 71b, 73a and 73b. Check valves 101a, 101b, 103a and 103b are of a standard design known in the art, and each may include a bleed 34 formed in the end thereof. Check valves 101a and 103a are in communication with pump 51a, while check valves 101b and 103b are in communication with pump 51b.

When swash plate 48a is in the forward position, one of ports 71a or 73a will be under high pressure and the other port will be under low pressure, or vacuum. When swash plate 48a is moved to the neutral position, neither port will be under pressure, and when the direction of swash plate 48a changes (e.g., from forward to reverse) the status of ports 71a and 73a will switch, with the formerly low pressure or vacuum side being placed under high pressure, and vice versa. The ends of each system ports 71a, 71b, 73a, and 73b are threaded to permit connection of hoses 70 and 72 and the like.

As shown in FIG. 6, an external oil reservoir 86 may be mounted at various locations on vehicle 12 or on pump apparatus 10. Oil drains from pump chamber 50 through case drain 38, and then through outlet hose 91b to reservoir 86. Oil returns to the system through inlet hose 91a, passing through filter 92 into charge pump inlets 75a and 75b. As shown in FIG. 5, case drain 38 is located in housing 20 in a location corresponding to pump chamber 50, so that oil will drain from chamber 50 to reservoir 86 and will be passed through filter 92 before its return to the system. Filter 92 could also be located on hose 91b. Referring to FIG. 7, passages 80 and 81 are formed in end cap 30 and connected to charge inlets 75a and 75b. The location of passages 80 and 81 between system ports 71a and 73a allows for a compact end cap 30.

Bearing 96a, which is preferably a standard friction bearing, is used not only to support input shaft 25 but also to divide passage 80 into two separate sides, where inlet 75a and kidney 93a, which supplies oil from reservoir 86 to charge pump 57a, are on one side thereof, and passage 94a, which provides pressurized oil from charge pump 57a to charge gallery 95a, is on the other side. A similar bearing 96b is also used to support second shaft 26.

As noted above, pump chamber 50 and gear chamber 45 can be strictly segregated, such that the hydraulic oil used in pumps 51a and 51b is independent of the lubricant for spur gears 52a, 52b and 52c. This segregation would permit the use of a gear lubricant in gear chamber 45, which may be desirable in certain applications. It should be obvious to those with skill in the art that the foregoing arrangement may be varied without departing from the scope of the present invention.

Figure 9:
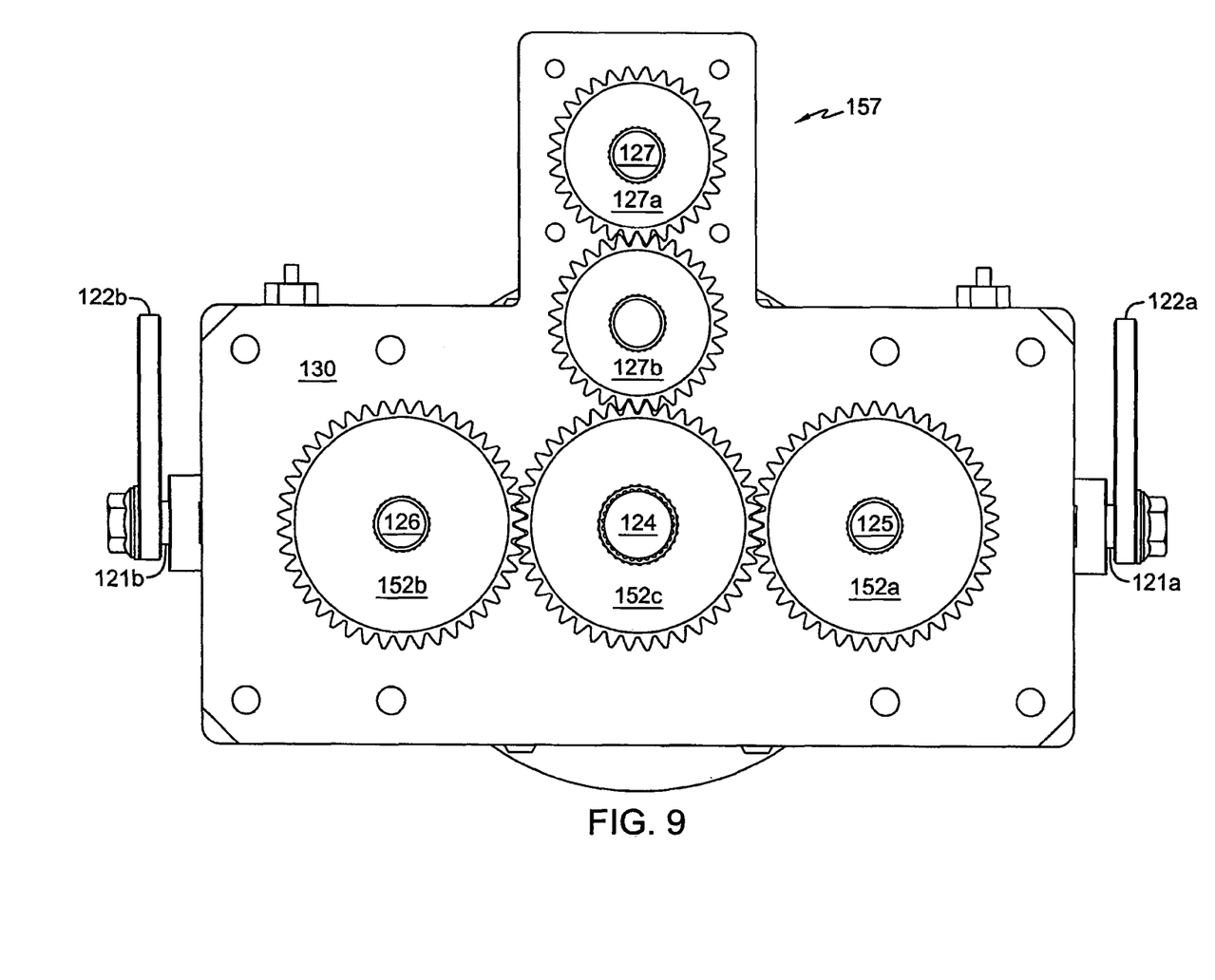
FIG. 9 is an end view of a second embodiment of this invention with the PTO and gear chamber cover removed.
Figure 10:
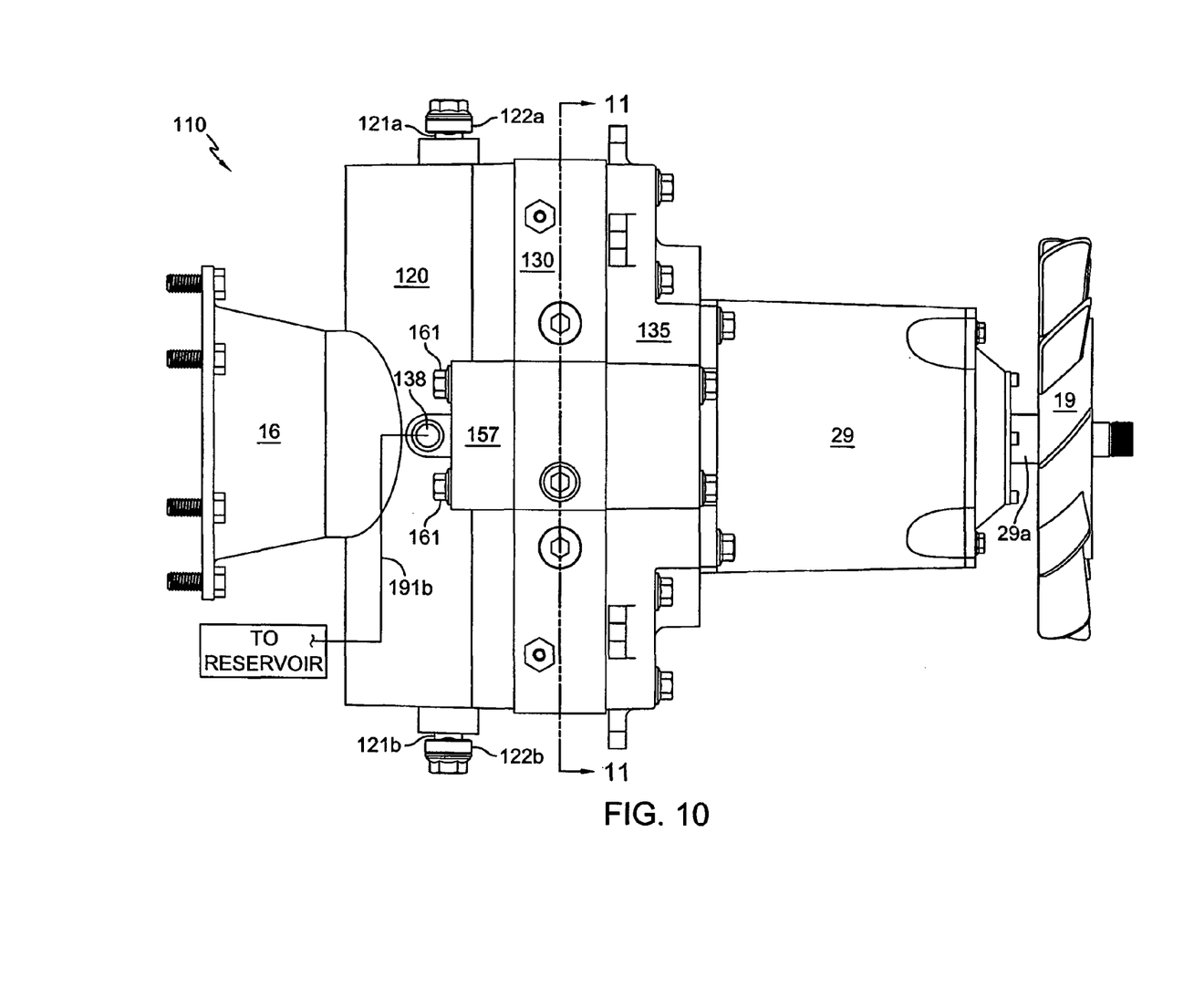
FIG. 10 is a top view of the dual pump and auxiliary pump design shown in FIG. 9.
Figure 11:
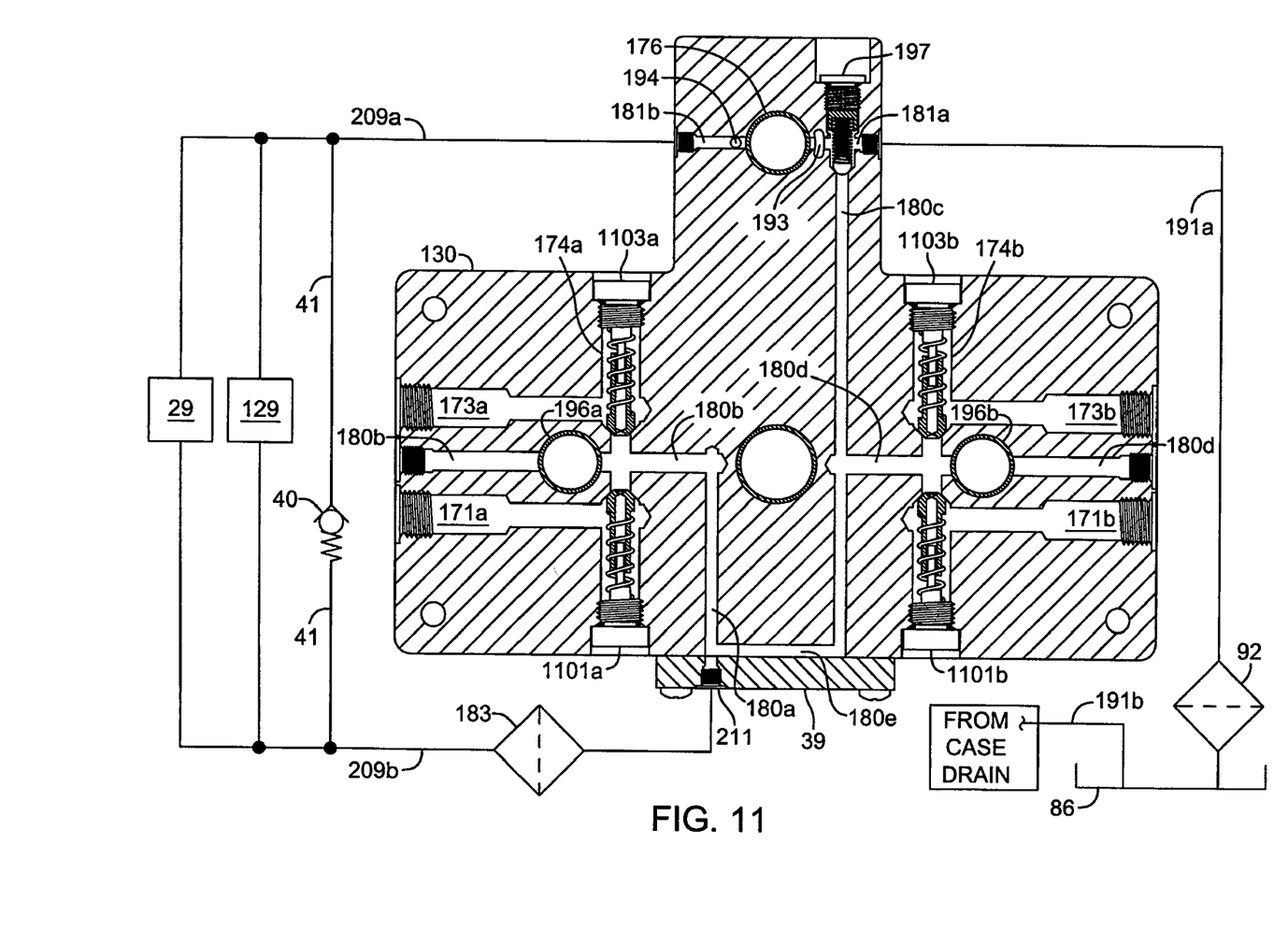
FIG. 11 is a cross sectional view of the end cap for the embodiment shown in FIG. 10, along lines 11-11, with certain system elements shown schematically.

A further embodiment of the present invention is shown in FIGS. 9-11. In this embodiment of pump apparatus 110, a third hydraulic pump, namely auxiliary pump 157 has been provided in place of charge pumps 57a and 57b and auxiliary pump 157 may provide pressure for PTO 29. As shown in FIGS. 9 and 10, auxiliary pump 157 may be positioned above main drive shaft 124 and input shafts 125, 126 and attached to housing 120 by fasteners 161. The orientation of swash plates 48a and 48b and the location of trunnion arms 121a and 121b, control arms 122a and 122b and output system ports 171a, 171b, 173a and 173b can remain generally the same as in the previous embodiment, as exemplified in FIG. 11. As shown in FIG. 9, main drive shaft 124 may be drivingly engaged to pump shafts 125, 126 and auxiliary pump shaft 127. The axes of rotation of pump shafts 125 and 126 form a first plane, and the axis of rotation of auxiliary pump shaft 127 is on one side of this first plane. The axes of rotation of auxiliary pump shaft 127 and input shaft 124 form a second plane that is perpendicular to the first plane. The axis of rotation of the input shaft is also common to this first plane, as shown in FIG. 9. FIG. 9 further discloses a gear train comprising gears 152a, 152b, 127a and 127b. Gear chamber cover 135 is secured to end cap 130 to form a gear housing. For driving auxiliary pump shaft 127, main drive shaft 124 may be coupled to gear 152c, which transfers the driving force from main input shaft 124 to gear 127b, then to gear 127a and then to auxiliary pump shaft 127. It should also be obvious to those with skill in the art that auxiliary pump 157 may also be positioned below gear 152c or may be positioned above or below shaft 125 or 126. However, the position shown is advantageous as it allows shafts 125 and 126 to be sized for the load of the pumps they drive and only shaft 124 carries the torque for more than one pump.

As shown in FIG. 10, trunnion arms 121a and 122b extend from opposite ends of housing 120. The addition of auxiliary pump 157 requires a different end cap 130. FIG. 11 shows a cross-section of end cap 130, taken along the lines 11-11 in FIG. 10. In this embodiment, system ports 173a and 171a correspond to pump 51a, and ports 171b and 173b correspond to pump 51b. As seen in FIGS. 9 and 11, end cap 130 uses a "T" shape having multiple extensions, with gear 152b and its corresponding pump 51b being on a first extension, gear 152a and its corresponding pump being on a second extension and gear 127a and the third or auxiliary pump 157 being on a third extension, where the first and second extensions form a main body and the third extension extends perpendicularly therefrom.

The charge and auxiliary pump configuration of this embodiment is different from that of pump apparatus 10, which does not include an auxiliary pump. Fluid is drawn from reservoir 86 through filter 92 into charge inlet line 191a, which is connected to charge inlet passage 181a. Passage 181a is a portion of passage 181 that is formed through end cap 130 and then separated into charge inlet passage 181a and charge outlet passage 181b by the insertion of bearing 176.

As is known in the industry, fluid is then drawn from charge inlet passage 181a through charge inlet kidney 193 by auxiliary pump 157, which then provides pressurized fluid through outlet passage 194 into auxiliary outlet 181b. Auxiliary pump 157 may be a gerotor type pump or similar pump. From auxiliary outlet 181b pressurized fluid travels through auxiliary line 209a to PTO 29 or to another hydraulic auxiliary device 129, which may be a deck lift for deck 89, hydraulic actuators for moving swash plates 48a and 48b, or other hydraulically operated devices. Fluid may return from auxiliary device 129 or PTO 29 by way of auxiliary return line 209b. The returned fluid passes through filter 183 and re-enters end cap 130 through auxiliary return inlet port 211 formed in auxiliary cap 39.

Properly sized auxiliary pump 157 will provide more fluid than is necessary to operate auxiliary device 129. To allow the excess fluid to escape the auxiliary circuit, an auxiliary relief valve 40 is provided in auxiliary relief line 41 that is connected between outlet 181b of auxiliary pump 157 and auxiliary return inlet port 211. A person of skill in the art will understand that the location of auxiliary relief valve 40 shown is exemplary, as valve 40 may be located in a variety of locations, including passages formed internal to end cap 130. Filter 183 may similarly by located in a variety of locations, including internal to end cap 130, and in some configurations, filter 183 may not be required.

After entry through auxiliary return inlet 211, the fluid then enters a charge fluid gallery comprising gallery 180e, two passages 180a and 180c extending into end cap 130, and passages 180b and 180d formed at right angles to passages 180a and 180c. Passages 180b and 180d are machined or formed in end cap 130 and each is then divided into two portions by bearings 196a and 196b, respectively, and the openings to passages 180b and 180d at the surface of end cap 130 are plugged. Gallery 180e is preferably formed on a side of end cap 130 and closed off by auxiliary cap 39.

Pumps 51a and 51b may not require all the fluid available and a charge relief valve 197 is provided to limit the pressure in passages 180a, 180b, 180c, 180d and 180e. As shown, this relieved fluid returns to inlet 181a of auxiliary pump 157. However, for additional cooling the relieved fluid may be returned to reservoir 86.

As shown in FIGS. 10 and 11, any fluid that escapes into the internal sump of housing 120 is returned to reservoir 86 through case drain 138 and case drain line 191b.

System ports 173a and 173b are also formed at a generally right angle to intersect with check plug ports 174a and 174b, respectively, for ease of manufacture. This design permits the insertion of check plugs 1101a, 1101b and 1103a, 1103b into end cap 130 in the manner shown. This arrangement keeps check plugs 1101a, 1101b and 1103a, 1103b away from the fluid flow between pumps 51a and 51b and system ports 171a and 173b, and 171b and 173b, respectively. Being positioned between pumps 51a and 51b and system ports 171 and 173 would tend to reduce efficiency of pump apparatus 110. Having all of the required elements located in the same plane also decreases the required thickness of end cap 130.

This arrangement permits pump apparatus 110 to be mounted on vehicle frame 88 so that the axes of pumps 51a and 51b are parallel to the longitudinal axis of the vehicle. This design permits main drive shaft 124 to be directly driven by engine 84. This design eliminates the need for a separate belt and pulley, which decreases costs and increases the efficiency of the unit. Reservoir 86 may be secured to pump apparatus 110 or to vehicle frame 88 by a variety of known fastening mechanisms.

In this design, control arms 122a and 122b are mounted on the sides of housing 120 with respect to vehicle frame 88, which may increase the ease of connection with the various linkage mechanisms 69, depending on the structure of vehicle 12. As shown in FIG. 1, this arrangement also simplifies the connection of hydraulic hoses 70 and 72 from system ports 171a, 171b, 173a and 173b to motors 90.

Figure 12:
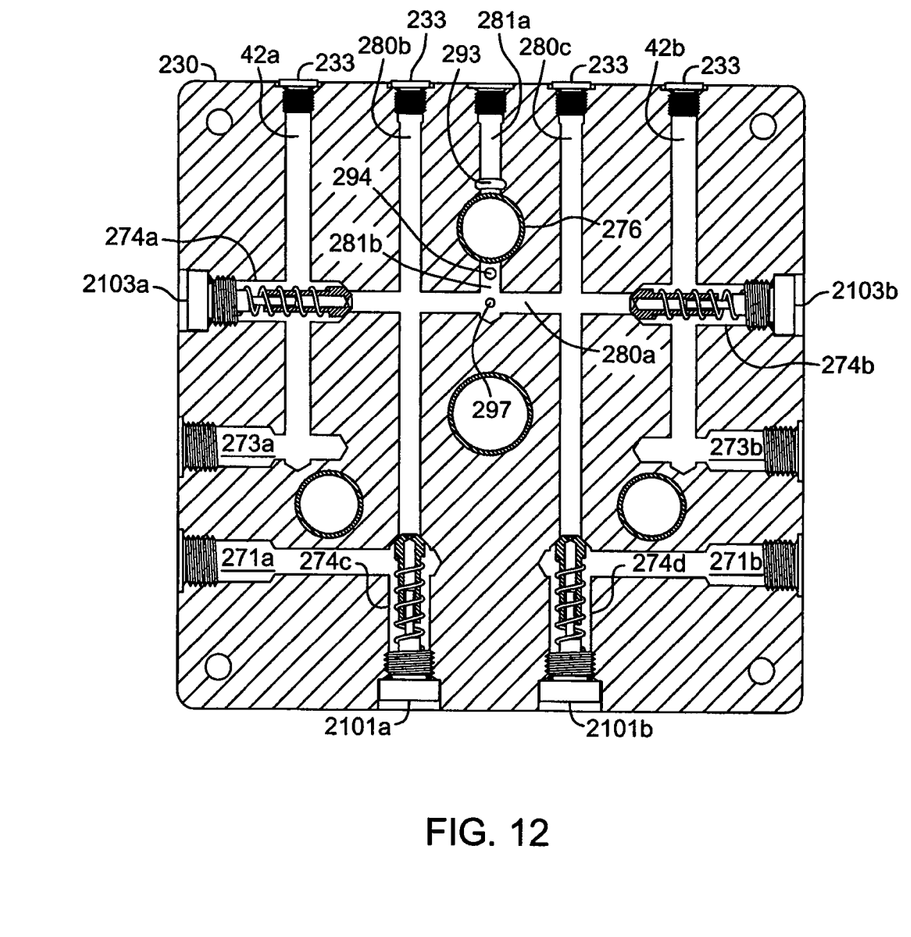
FIG. 12 is a cross-sectional view of an alternative end cap design for the embodiment shown in FIG. 11.

FIG. 12 shows a cross-section of another embodiment of this invention, where end cap 230 is similar in many ways to end cap 130 of FIG. 11. In this embodiment, a single charge pump (not shown) provides fluid to pumps 51a and 51b. System ports 271a and 273a correspond to pump 51a, and ports 271b and 273b correspond to pump 51b. The orientation of swash plates 48a, 48b and the location of trunnion arms 21a and 21b, control arms 22a and 22b and output system ports 271a, 271b, 273a and 273b would remain similar to that of the first two embodiments.

Fluid enters the charge pump from reservoir 86 through charge inlet 281a. From inlet 281a fluid passes through kidney-shaped opening 293 into the charge pump. The charge pump forces fluid through passage 294 into passage 281b, which is also the entry into charge gallery 280. Passages 281a and 281b are formed in a single operation and then separated by the insertion of bearing 276 into its bore. For convenience the opening to charge relief 297 is located in passage 281b, though it may be located at any position where it may communicated with charge gallery 280. Charge gallery 280 is formed by passage 280a extending between check plug 2103a positioned in port 274a and check plug 2103b positioned in port 274b, and passages 280b and 280c are formed at right angles to passage 280a and parallel with check plug 2101a positioned in port 274c and check plug 2101b positioned in port 274d. Passages 280b and 280c are then closed by plugs 233. Check plug 2103a is connected to system port 273a by connecting passage 42a. Similarly, check plug 2103b is connected to system port 273b by connecting passage 42b. Connecting passages 42a and 42b are closed at the edge of end cap 230 by plugs 233.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

The invention claimed is:

1. A hydraulic apparatus for a vehicle, the hydraulic apparatus comprising:
    an end cap comprising a first side and a second side opposite the first side;
    hydraulic porting formed within the end cap;
    a first hydraulic pump in communication with the hydraulic porting, the first hydraulic pump rotatably disposed on the first side of the end cap and comprising a first axis of rotation;
    a second hydraulic pump in communication with the hydraulic porting, the second hydraulic pump rotatably disposed on the first side of the end cap and comprising a second axis of rotation;
    a third hydraulic pump rotatably disposed on the first side of the end cap and comprising a third axis of rotation;
    a first pump shaft drivingly engaged to the first hydraulic pump, a second pump shaft drivingly engaged to the second hydraulic pump, a third pump shaft drivingly engaged to the third hydraulic pump and an input shaft that drives the first pump shaft, the second pump shaft and the third pump shaft; and
    a gear train driven by the input shaft, the gear train comprising a first gear attached to the first pump shaft, a second gear attached to the second pump shaft, a third gear attached to the third pump shaft and an input gear drivingly connected to the first gear, the second gear and the third gear wherein the gear train is located adjacent the second side of the end cap;

wherein the first axis of rotation and the second axis of rotation define a first plane, and the third hydraulic pump and the input shaft are located on a first side of the first plane.

2. The hydraulic apparatus of claim 1, wherein the input shaft axis of rotation and the third axis of rotation define a second plane, wherein the second plane is perpendicular to the first plane.

3. The hydraulic apparatus of claim 1, further comprising a gear housing enclosing the gear train, and a power take off attached to the gear housing and driven by the input shaft.

4. The hydraulic apparatus of claim 3, further comprising a power take off valve located within the gear housing, wherein the power take off valve regulates the amount of pressurized fluid delivered to the power take off.

5. The hydraulic apparatus of claim 3, wherein the power take off further comprises a brake.

6. The hydraulic apparatus of claim 5, further comprising a power take off valve located in the gear housing, wherein the power take off valve controls fluid flowing into and away from the power take off to alternatively actuate the power take off and the brake.

7. The hydraulic apparatus of claim 1, further comprising a plurality of check valves located in the hydraulic porting, a first of the plurality of check valves having a first axial direction perpendicular to a second axial direction of a second of the plurality of check valves.

8. The hydraulic apparatus of claim 1, wherein the third hydraulic pump provides pressurized hydraulic fluid to the first hydraulic pump and the second hydraulic pump.

9. The hydraulic apparatus of claim 1, wherein the third hydraulic pump provides hydraulic fluid to an apparatus external to the hydraulic apparatus through an outlet port formed on an external surface of the end cap.

10. The hydraulic apparatus of claim 9, wherein the end cap further comprises a plurality of system ports for connecting the hydraulic porting to at least one hydraulic motor, and wherein the outlet port and at least one of the plurality of system ports are formed on the same side of the end cap.

11. The hydraulic apparatus of claim 1, wherein the third hydraulic pump provides pressurized hydraulic fluid to the first hydraulic pump, the second hydraulic pump and an apparatus external to the hydraulic apparatus.

12. The hydraulic apparatus of claim 1, further comprising a first end cap extension comprising a first running surface, a second end cap extension comprising a second running surface and a third end cap extension comprising a third running surface, wherein the first, second and third running surfaces are coplanar with the first side of the end cap.

13. The hydraulic apparatus of claim 12, wherein the first hydraulic pump is mounted on the first end cap extension, the second hydraulic pump is mounted on the second end cap extension and the third hydraulic pump is mounted on the third end cap extension.

14. An end cap for a hydraulic apparatus including a first pump driven by a first pump shaft, a second pump driven by a second pump shaft and a third pump driven by a third pump shaft, the end cap comprising:

a main body having a first end, a second end, a plurality of edge surfaces located between the first end and the second end, a first pump location for mounting the first pump, and a second pump location for mounting the second pump;

a projection integrally formed with and projecting away from the main body, the projection comprising at least one edge surface extending in a direction generally perpendicular to one of the edge surfaces of the main body, the projection further comprising a third pump location for mounting the third pump; and porting formed within the main body and the projection, wherein each of the first pump location, second pump location and third pump location are in fluid communication with at least a portion of the porting;

the main body and the projection together forming a first side and a second side opposite to the first side;

wherein the first pump location, the second pump location and the third pump location are located on the first side.

15. The end cap of claim 14, wherein the porting hydraulically connects the third pump to the first pump and the second pump.

16. The end cap of claim 14, wherein the porting hydraulically connects the third pump to an apparatus external to the hydraulic apparatus.

17. The end cap of claim 14, further comprising an input shaft drivingly connected to the first pump shaft, the second pump shaft and the third pump shaft, wherein axes of rotation of the input shaft, the first pump shaft and the second pump shaft are disposed within a common plane.

18. The end cap of claim 14, further comprising a relief valve located in the projection, wherein the relief valve releases from the porting excess hydraulic fluid provided by the third pump.

19. A hydraulic apparatus comprising:

a first pump driven by a first pump shaft, a second pump driven by a second pump shaft and a third pump driven by a third pump shaft;

an end cap comprising:

a main body having a first end, a second end, a plurality of edge surfaces located between the first end and the second end, a first pump location on which is disposed the first pump, and a second pump location on which is disposed the second pump;

a projection integral with and projecting away from the main body, the projection comprising at least one edge surface extending in a direction generally perpendicular to one of the edge surfaces of the main body, the projection further comprising a third pump location on which is disposed the third pump; and hydraulic porting formed within the main body and the projection, wherein each of the first pump location, second pump location and third pump location are in fluid communication with at least a portion of the porting;

the main body and the projection together forming a first side and a second side opposite to the first side;

wherein the first pump location, second pump location and third pump location are formed on the first side.

20. A hydraulic apparatus of claim 19, wherein the third pump provides hydraulic fluid through the hydraulic porting to an apparatus external to the hydraulic apparatus.

21. A hydraulic drive apparatus for a vehicle, comprising:

an end cap comprising a first side and a second side opposite the first side;

hydraulic porting formed within the end cap;

a first hydraulic pump in communication with the hydraulic porting, the first hydraulic pump rotatably disposed on the first side of the end cap and comprising a first axis of rotation;

a second hydraulic pump in communication with the hydraulic porting, the second hydraulic pump rotatably disposed on the first side of the end cap and comprising a second axis of rotation; and a third hydraulic pump rotatably disposed on the first side of the end cap and comprising a third axis of rotation, wherein the third hydraulic pump provides hydraulic fluid to an apparatus external to the hydraulic drive apparatus through an outlet port formed on an external surface of the end cap.

22. The hydraulic drive apparatus of claim 21, wherein the first axis of rotation and the second axis of rotation define a first plane, and the third hydraulic pump is located on a first side of the first plane.

23. The hydraulic drive apparatus of claim 22, further comprising a first pump shaft drivingly engaged to the first hydraulic pump, a second pump shaft drivingly engaged to the second hydraulic pump, a third pump shaft drivingly engaged to the third hydraulic pump and an input shaft that drives the first pump shaft, the second pump shaft and the third pump shaft, wherein the input shaft is located on the first side of the first plane.

24. The hydraulic drive apparatus of claim 23, wherein the input shaft axis of rotation and the third axis of rotation define a second plane, wherein the second plane is perpendicular to the first plane.

25. The hydraulic drive apparatus of claim 21, further comprising a plurality of check valves located in the hydraulic porting, a first of the plurality of check valves having a first axial direction perpendicular to a second axial direction of a second of the plurality of check valves.

26. The hydraulic drive apparatus of claim 21, wherein the third hydraulic pump additionally provides pressurized hydraulic fluid to the first hydraulic pump and the second hydraulic pump.

27. The hydraulic drive apparatus of claim 21, wherein the end cap further comprises a plurality of system ports for connecting the hydraulic porting to at least one hydraulic motor, and wherein the outlet port and at least one of the plurality of system ports are formed on the same side of the end cap.

28. The hydraulic drive apparatus of claim 21, further comprising an input shaft, a first end cap extension comprising a first running surface, a second end cap extension comprising a second running surface and a third end cap extension comprising a third running surface, wherein the first, second and third running surfaces are coplanar with the first side of the end cap.

29. The hydraulic drive apparatus of claim 28, wherein the first hydraulic pump is mounted on the first end cap extension, the second hydraulic pump is mounted on the second end cap extension and the third hydraulic pump is mounted on the third end cap extension.

* * * * *